Jan. 28, 1930.  K. HERZOG  1,744,764
DEVICE FOR REMOVING PIPES MADE OF ASBESTOS CEMENT
Filed Nov. 20, 1928

Inventor
Karl Herzog
By
B. Singer, Atty.

Patented Jan. 28, 1930

1,744,764

UNITED STATES PATENT OFFICE

KARL HERZOG, OF NIEDERURNEN, SWITZERLAND, ASSIGNOR TO ETERNIT INC., OF PHILADELPHIA, PENNSYLVANIA

DEVICE FOR REMOVING PIPES MADE OF ASBESTOS CEMENT

Application filed November 20, 1928, Serial No. 320,643, and in Switzerland November 22, 1927.

This invention relates to a new and improved device for manufacturing pipes from asbestos cement and similar materials.

A method to manufacture pipes well known consists in winding up or making coils of sheets or slabs made on the well known cardboard machine from an asbestos-cement-mixture while still plastic on a mandrel. The wound up blank thus produced is thereupon wrapped up in a water pervious cover and while it remains in this cover it is subjected to strong pressure. This pressing is effected, for instance, by one or more rotating pressing rollers being pressed by suitable means against the wrapped blank. Through the pressing of the wrapped blank described above an intimate uniting or felting of the separated layers of the blank is effected and the blank consisting of separate superposed layers is converted into a pipe of homogeneous and close texture, which is very resistent to pressure. After the application of pressure the mandrel may be at once removed. In order that the pipe which is still soft shall retain its shape, the mandrel on which it is wound is replaced by a wooden mandrel, the pipe remaining on this wooden mandrel until the cement has set.

The main object of the invention is to provide an improved device to remove the pipe while it is still soft from the mandrel without damaging the pipe or deforming the same.

I attain this and other objects by a device adapted to retain the pipe while the mandrel is being withdrawn. The said device comprises means to exert a uniform pressure all over the mantle of the pipe, and to securely hold the pipe in its true cylindrical shape.

In the accompanying drawings I have illustrated merely one embodiment of my invention in a diagrammatical manner.

Figure 1:
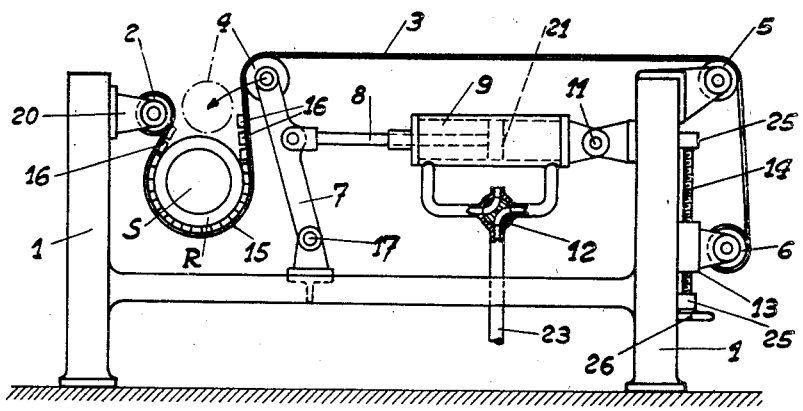
Fig. 1 is a side elevation of the device.
Figure 2:
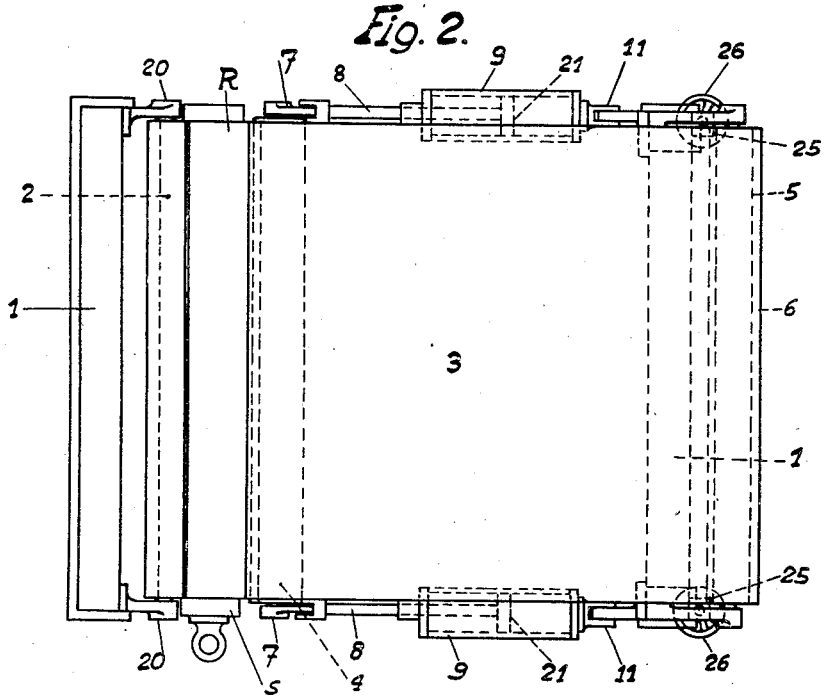
Fig. 2 is a ground plan.

In a rigid frame 1 a roller 2 is rotatably mounted in suitable bearings 20. The length of this roller 2 corresponds to the length of the pipe R formed on a mandrel S in the manner as described in my previous Patent No. 1,670,855. On the roller 2 one edge of a web 3 of tough, pliable fabric is fastened, the web 3 passes over two guide rollers 4, 5, to a roller 6 on which it is rolled. The roller 4 is rotatably mounted in the upper ends of levers 7 pivoted at 17 to the frame 1. To each lever 7 the rod 8 of piston 21 of a pneumatic cylinder 9 is linked. The cylinder 9 is pivoted at 11 to the frame 1 and is provided with a reversing valve 12 by means of which compressed air may be admitted to any side of the piston 21. The valve 12 is operated by hand, the compressed air is supplied by a flexible hose 23. The guide roller 5 is journalled in bearings 24 of the frame 1 and the guide roller 6 is mounted in bearings 13 slidably mounted in vertical guides of frame 1. The bearings 13 may be adjusted in vertical direction by screw threaded spindles 14 journalled in lugs 25 of the frame 1. Each spindle 14 is provided with a wheel 26 by which it can be turned. That piece of the web 3 laying between the rollers 2 and 4 is provided with lathes 16 of wood running parallel each other and to the axis of the rollers 2, 4. The face of the lathes 16 coming in contact with pipe R are covered with leather, or in place of the leather short metallic pins may be arranged or any other means to secure a good grip of the members 16 on the pipe R.

To remove a pipe R the mandrel S with the pipe R adhering thereto is placed in the sling of the web 3 between the rollers 2, 4. Compressed air is admitted to the cylinder 9 on the right hand side of piston 21. The piston moves the levers 7 and therewith the rollers 4 to the left Fig. 1 until the roller 4 assumes the position shown in broken lines in Fig. 1. The web 3 with the lathes 16 covers approximately the whole outer mantle of the pipes R and is pressed on the pipe with a pressure corresponding to the pressure, of the compressed air used in the cylinder 9. The pressure exerted on the pipe R is equal all over its surface. By adjusting the position of roller 6 the size of the sling 15 may be varied to suit pipes of different diameters. After the pipe R is firmly held by the web 3 the mandrel S is withdrawn by means of a mechanical pulling device out of the pipe. The pipes R still soft retains its shape and is removed. In place of the mandrel S a wooden shaft which is preferably composed of several parts is inserted in the pipe and the latter is removed to set. Hydraulic means might be used in place of the pneumatic cylinder 9 as described.

What I wish to secure by U. S. Letters Patent, is:—

1. A device for removing a pipe made of asbestos cement while it is still plastic from the mandrel on which it has been formed comprising in combination a frame, rollers rotatably mounted in said frame, a web fixed at both ends, a sling in said web adapted to receive the pipe, means to temporarily reduce the size of said sling and to press the web on said pipe.

2. A device for removing a pipe made of asbestos cement while it is still plastic from the mandrel on which it has been formed comprising in combination a frame, rollers rotatably mounted in said frame, a web fixed at both ends, a sling in said web adapted to receive the pipe, some of said rollers being movably arranged in said frame to temporarily reduce the size of the sling and to press the web on said pipe.

3. A device for removing a pipe made of asbestos cement while it is still plastic from the mandrel on which it has been formed comprising in combination a frame, rollers rotatably mounted in said frame, a web fixed at both ends, a sling in said web adapted to receive the pipe some of said rollers being movably arranged in said frame means to shift the rollers by fluid pressure to temporarily reduce the size of the sling and to press the web on said pipe.

4. A device for removing a pipe made of asbestos cement while it is still plastic from the mandrel on which it has been formed comprising in combination a frame, rollers rotatably mounted in said frame, a web fixed at both ends, a sling in said web adapted to receive the pipe, friction members attached to said web, adapted to grip the pipe on its outer surface, some of said rollers being movably arranged in said frame, fluid actuated means to move said rollers and said web with reference to the pipe to exert a pressure on said pipe substantially as described.

In testimony whereof I affix my signature.

KARL HERZOG.